United States Patent [19]

Hassan et al.

[11] Patent Number: 5,745,578
[45] Date of Patent: Apr. 28, 1998

[54] APPARATUS AND METHOD FOR SECURE COMMUNICATION BASED ON CHANNEL CHARACTERISTICS

[75] Inventors: Amer Aref Hassan, Cary, N.C.; John Erik Hershey, Ballston Lake, N.Y.; Sandeep Chennakeshu, Cary, N.C.

[73] Assignee: Ericsson Inc., Research Triangle Park, N.C.

[21] Appl. No.: 665,339

[22] Filed: Jun. 17, 1996

[51] Int. Cl.[6] .............................. H04L 9/00; H04B 7/00; H04B 17/00; H04Q 3/02
[52] U.S. Cl. .............................. 380/44; 380/21; 455/38.5; 455/67.4
[58] Field of Search ........................ 380/21, 44; 455/38.5, 455/36.1, 37.1, 67.4, 67.6

[56] References Cited

U.S. PATENT DOCUMENTS

| | | | |
|---|---|---|---|
| 4,140,973 | 2/1979 | Stevens | 325/67 |
| 4,264,959 | 4/1981 | Bläss | 364/487 |
| 4,275,446 | 6/1981 | Blaess | 364/487 |
| 4,429,180 | 1/1984 | Unkenholz | 380/48 |
| 4,633,463 | 12/1986 | Mack | 370/95 |
| 4,696,053 | 9/1987 | Mastriani et al. | 455/67 |
| 4,780,885 | 10/1988 | Paul et al. | 375/40 |
| 4,903,324 | 2/1990 | Warnagiris | 455/69 |
| 5,084,669 | 1/1992 | Dent | 324/83 D |
| 5,151,919 | 9/1992 | Dent | 375/1 |
| 5,220,275 | 6/1993 | Holmqvist | 324/76.82 |
| 5,353,352 | 10/1994 | Dent et al. | 380/37 |
| 5,506,861 | 4/1996 | Bottomley | 375/200 |
| 5,604,806 | 2/1997 | Hassan et al. | 380/44 |
| 5,613,211 | 3/1997 | Matsuno | 455/51.1 |

OTHER PUBLICATIONS

R. Blahut, *Theory and Practice of Error Control Codes*, chapt. 7, Addison–Wesley, Reading, MA (1983).
D. Calcutt et al., *Satellite Communications: Principles and Applications*, chapt. 7, Edward Arnold, London (1994).
W. Diffie et al., "Privacy and Authentication: An Introduction to Cryptography", *Proc. IEEE* vol. 67, pp. 397–427 (Mar. 1979).
W. Diffie, "The First Ten Years of Public–Key Cryptography", *Proc. IEEE* vol. 76, pp. 560–577 (May 1988).
K. Gilhousen et al., "On the Capacity of a Cellular CDMA System", *IEEE Trans. Veh. Technol.* vol. 40, pp. 303–312 (May 1991).
R.I. Rivest et al., "A Method of Obtaining Digital Signatures and Public–Key Cryptosystems", *Commun. of the ACM* vol. 21, pp. 120–126 (Feb. 1978).
C.E. Shannon, "Communication Theory of Secrecy Systems", *Bell Sys. Tech. J.* vol. 28, pp. 656–715 (Oct. 1949).

*Primary Examiner*—Thomas H. Tarcza
*Assistant Examiner*—Hrayr A. Sayadian
*Attorney, Agent, or Firm*—Burns, Doane, Swecker & Mathis, LLP

[57] ABSTRACT

A method and an apparatus for establishing a key sequence for secure communication through a communication channel between a first transceiver and a second transceiver. Each transceiver transmits to the other transceiver a plurality of tones having predetermined phases and frequencies. Each transceiver transmits back to the other transceiver, without substantial change, the plurality of tones transmitted by the other transceiver. The transceivers determine a key based on the differences in the phases of transmitted and received plurality of tones.

10 Claims, 4 Drawing Sheets

APPARATUS AND METHOD FOR SECURE COMMUNICATION BASED ON CHANNEL CHARACTERISTICS

BACKGROUND

Applicants' invention relates to apparatus and methods for communicating information securely, which is to say with reduced susceptibility to eavesdropping, through communication links, such as telephone lines, that have either non-reciprocal or reciprocal characteristics.

The widespread need for secure communication systems is apparent. As just one example, financial transactions are routinely conducted through telephone lines. In this and many other examples, it is critical that the communications of information are conducted with almost perfect secrecy, despite potential eavesdroppers' having access to strong information signals.

One way of providing security is to encrypt the communicated information according to some system that the users have agreed in advance to use. Several encryption methods have been described in the literature, such as the data encryption standard (DES) and public key cryptography (PKC). As explained in W. Diffie et al., "Privacy and Authentication: An Introduction to Cryptography", *Proc. IEEE* vol. 67, pp. 397–427 (March 1979), a classical cryptographic system is in general a set of instructions, a piece of hardware, or a computer program that can convert plaintext (unencrypted information) to ciphertext, or vice versa, in a variety of ways, one of which is selected by a specific key that is known to the users but is kept secret from others. The DES is a classical cryptographic system.

Popular PKC systems make use of the fact that finding large prime numbers is computationally easy but factoring the products of two large prime numbers is computationally difficult. PKC systems have an advantage over other cryptographic systems like the DES in that a PKC system uses a key for decryption that is different from the key for encryption. Thus, a PKC user's encryption key can be published for use by others, and the difficulty of securely distributing keys is avoided. See, e.g., R. I. Rivest et al., "A Method of Obtaining Digital Signatures and Public-Key Cryptosystems", *Commun. of the ACM* vol. 21, pp. 120–126 (February 1978); and W. Diffie, "The First Ten Years of Public-Key Cryptography", *Proc. IEEE* vol. 76, pp. 560–577 (May 1988).

For either a classical or PKC system, the security of a message is dependent to a great extent on the length of the key, as described in C. E. Shannon, "Communication Theory of Secrecy Systems", *Bell Sys. Tech. J.* vol. 28, pp. 656–715 (October 1949).

Unfortunately, it is often the case that two users (two police officers, for instance) have not agreed in advance to share a secret key. This makes secure real-time communication impossible via a classical cryptographic system and even via a PKC system, which requires a user to generate a pseudo-random quantity. Moreover, popular PKC systems are unprovably secure, and suffer from severe requirements in computational complexity and amount of information that must be exchanged. As new ways of attacking PKC systems are mounted, PKC systems will retreat to ever longer exchange vectors (in effect, larger prime numbers) and ever more complex computations. As a result, classical and PKC cryptographic systems are less than ideal for many communication situations.

Besides providing for security, much effort is expended to overcome the inevitable transmission errors that afflict communication systems, errors that can have dire consequences in a digital communication system. One way of dealing with such errors is to use error-correction codes that reduce the probability of bit errors at the receiver. For example, analog information to be transmitted is converted into digital information, which is then transformed according to a block error-correction code. As pointed out in D. Calcutt et al., *Satellite Communications: Principles and Applications* pp. 136–161, the process of coding packages the bits that contain information to be transmitted with other bits, sometimes called "redundant bits" because they contain no information, that can assist in the detection and correction of errors.

Many modern digital communication systems employ such error-correction schemes, including such cellular radio systems as the North American digital advanced mobile phone service (D-AMPS), some of the characteristics of which are specified by the IS-54-B and IS-136 standards published by the Electronic Industries Association and Telecommunications Industry Association (EIA/TIA), and the European GSM system.

In such time-division multiple access (TDMA) systems, each radio channel, or radio carrier frequency, is divided into a series of time slots, each of which contains a burst of information from a data source, e.g., a digitally encoded portion of a voice conversation. During each time slot, 324 bits may be transmitted, of which the major portion, 260 bits, is due to the speech output of a coder/decoder (codec), including bits due to error-correction coding of the speech output. The remaining bits are used for guard times and overhead signaling for purposes such as synchronization. Control information is sent in a similar way. Time slot formats on a digital control channel according to the IS-136 standard are substantially the same as the formats used for digital traffic channels under the IS-54-B standard, but new functionalities are accorded to the fields in each slot in accordance with U.S. patent application Ser. No. 08/331,703 filed Oct. 31, 1994, now U.S. Pat. No. 5,604,744.

Other approaches to communication use systems called code division multiplexing (CDM) and code division multiple access (CDMA). In a conventional CDMA system, a digital information sequence to be communicated is spread, or mapped, into a longer digital sequence by combining the information sequence with a spreading sequence. As a result, one or more bits of the information sequence are represented by a sequence of N "chip" values. In one form of this process, called "direct spreading", each spread symbol is essentially the product of an information symbol and the spreading sequence. In a second form of spreading called "indirect spreading", the different possible information symbols are replaced by different, not necessarily related, spreading sequences. It will be understood that the information symbols may be produced by preceding stages of channel coding and/or spreading. Various aspects of conventional CDMA communications are described in K. Gilhousen et al., "On the Capacity of a Cellular CDMA System," *IEEE Trans. Veh. Technol.* vol. 40, pp. 303–312 (May 1991); and the following U.S. patent documents: U.S. Pat. No. 5,151,919 to Dent; and U.S. Pat. No. 5,353,352 to Dent et al.; and U.S. patent application Ser. No. 08/155,557 filed Nov. 22, 1993 U.S. Pat. No. 5,506,861.

SUMMARY

In accordance with Applicants' invention, characteristics of a communication channel are used to establish and exchange cryptographic keys with almost perfect secrecy, These characteristics are the impedances of the channel as seen by the users, i.e., the impedance viewed from a position A looking to a position B and the impedance viewed from position B looking to position A. For a non-reciprocal channel, these impedances are generally not identical. The keys can be established with computations equivalent to a bounded distance decoding procedure, and the decoder used to establish a key may be used for processing the subsequent data transmission.

Thus, compared to classical and PKC cryptographic systems, Applicants' invention provides an alternative mechanism for establishing and sharing cryptographic keys that depends on a physical process. With Applicants' system, there is no need for each party to generate a pseudo-random quantity because the necessary randomness is provided by the unpredictable variability of the communication channel itself. By using a channel decoder, the probability of two users' establishing the same secret key is close to one, and the probability of an eavesdropper's establishing the same key is essentially zero. This is called "probabilistic secrecy". Also, the number of possible keys is large enough that finding the correct one by exhaustive search is impractical. This is called "computational secrecy". These probabilistic measures are different from the Shannon measure of perfect secrecy.

In one aspect, Applicants' invention provides a method of establishing a key sequence for secure communication through a communication channel between a first transceiver and a second transceiver. This method comprises the steps of, in the first transceiver, transmitting a first plurality of tones, each tone having a respective predetermined frequency and a predetermined initial phase; and in the second transceiver, receiving the first plurality of tones transmitted by the first transceiver and, without substantial change, transmitting the received first plurality of tones back to the first transceiver. In a similar way, the second transceiver carries out the steps of transmitting a second plurality of tones having respective predetermined frequencies and initial phases, and in the first transceiver, receiving the second plurality of tones and, without substantial change, transmitting the received second plurality of tones back to the second transceiver.

This method further includes, in the first transceiver, the steps of determining differences between the phases of pairs of the tones received; quantizing each difference into a respective one of a plurality of phase decision values; and decoding a plurality of the quantized differences into a key sequence according to a predetermined block code. In a similar way, the second transceiver carries out the steps of determining differences between the phases of pairs of the tones received; quantizing each difference into a respective one of a plurality of phase decision values; and decoding a plurality of the quantized differences into a key sequence according to a predetermined block code.

In accordance with Applicants' invention, the probability that the key sequences determined by the first and second transceivers are the same is substantially unity.

The method may further include, in each of the first and second transceivers, the step of determining a magnitude of each of its respective plurality of tones, where the magnitudes are used in the decoding step as soft information. Also, the method may further include, in at least one of the first and second transceivers, the step of encrypting information to be transmitted according to the key sequence; and in at least the other one of the first and second transceivers, the step of decrypting encrypted transmitted information according to the key sequence.

In another aspect of Applicants' invention, a method of establishing a key sequence for secure communication through a communication channel between a first transceiver and a second transceiver includes the steps of, in the first transceiver, transmitting a first predetermined digital word including a plurality of bits; and in the second transceiver, receiving the first predetermined digital word and transmitting the received first predetermined digital word without substantial change back to the first transceiver. This method further includes the steps of, in the second transceiver, transmitting a second predetermined digital word including a plurality of bits; and in the first transceiver, receiving the second predetermined digital word and transmitting the received second predetermined digital word without substantial change back to the second transceiver.

The method in this aspect of the invention further includes the steps of, in the first transceiver, hard-decision decoding each of the plurality of bits in the first predetermined digital word received from the second transceiver; and mapping the hard-decision decoded plurality of bits into a key sequence according to a predetermined block code; and in the second transceiver, hard-decision decoding each of the plurality of bits in the second predetermined digital word received from the first transceiver; and mapping the hard-decision decoded plurality of bits into the key sequence according to the predetermined block code.

The method may further include, in each of the first and second transceivers, the step of determining a magnitude of each of the plurality of bits of its respective received predetermined digital word, where the magnitudes are used in the mapping steps as soft information.

In another aspect of Applicants' invention, a method of establishing a key sequence for secure communication through a communication channel between a first transceiver and a second transceiver includes the steps of, in the first transceiver, transmitting a first predetermined digital word including a plurality of bits; and in the second transceiver, receiving the first predetermined digital word transmitted by the first transceiver, and transmitting the received first predetermined digital word without substantial change back to the first transceiver. The method further includes the steps of, in the second transceiver, transmitting a second predetermined digital word including a plurality of bits; and in the first transceiver, receiving the second predetermined digital word transmitted by the second transceiver, and transmitting the received second predetermined digital word without substantial change back to the second transceiver.

In the first transceiver, a phase of each of the plurality of bits of the first predetermined digital word received from the second transceiver is determined; a difference between each phase determined and a respective predetermined phase is determined; each difference is quantized into a respective one of a plurality of phase decision values; and a plurality of the quantized differences are decoded into a key sequence according to a predetermined block code. In the second transceiver, a phase of each of the plurality of bits of the second predetermined digital word received from the first transceiver is determined; a difference between each phase determined and a respective predetermined phase is determined; each difference is quantized into a respective one of a plurality of phase decision values; and a plurality of the quantized differences are decoded into the key sequence according to the predetermined block code.

This method may further include, in each of the first and second transceivers, the step of determining a magnitude of each of the plurality of bits of its respective received predetermined digital word, where the magnitudes are used in the decoding steps as soft information.

In various other aspects, Applicants' invention provides several apparatus for establishing a key sequence for secure wireline communication between a first transceiver and a second transceiver.

BRIEF DESCRIPTION OF THE DRAWINGS

Applicants' invention is described below in more detail with reference to embodiments that are given only by way of example and that are illustrated in the accompanying drawings, in which.

DETAILED DESCRIPTION

While the following description is in the context of wireline telephone systems, it will be understood by those skilled in the art that Applicants' invention may be applied to other communication systems that use reciprocal or non-reciprocal communication channels.

As explained in Applicants' U.S. patent application Ser. No. 08/376,144 filed on Jan. 20, 1995, now U.S. Pat. No. 5,604,806, and U.S. patent application Ser. No. 08/555,968 filed on Nov. 13, 1995, which is continuation in part of the '806 patent, Applicants' invention provides methods and apparatus for establishing two sequences, one at a transmitter and another at a receiver, such that with high probability the two sequences fall within the same one of a plurality of "spheres". Both of these U.S. patent applications are incorporated here by reference. The "spheres" are constructed by t-sphere packing $M^n$ vectors r into S spheres, where t is the Hamming radius, in an n-dimensional vector space consisting of all vectors having elements that are contained in the Galois field $GF(M=2^m)$, viz., all $r=(r_1, r_2, \ldots r_n)$ where $r_i \in GF(M=2^m)$. (In this description, vector quantities, or sequences, are indicated by bold type and scalar quantities and functions are indicated by plain type.) The vectors in a sphere are mapped into a representative consisting of the center of that sphere, and the set of S representatives is $\{c_1, c_2, c_S\}$. Each representative vector $c_i$ has a length n and can be mapped into a binary vector k having a length mn, and the set of corresponding binary vectors is $K=\{k_1, k_2, \ldots, k_S\}$.

In accordance with Applicant's invention, the transmitter and receiver establish, with high probability, a common sequence $k_i$ that is contained in the set K, and use the sequence $k_i$ for spreading an information sequence communicated from the transmitter to the receiver. Since the probability is substantially zero that an eavesdropper can determine that common sequence $k_i$, secure communication is also achieved—without incorporating an extra encryption and decryption algorithm to achieve cryptographic security. The spheres constructed in accordance with Applicant's invention increase the probability of the transmitter's and receiver's establishing such a common sequence $k_i$, recognizing that in general the transmitter establishes a sequence $r_T$ and the receiver establishes a different sequence $r_R$. If the sequences $r_T$, $r_R$ fall within the same sphere, they are mapped into the same sequence k in the set K.

SEQUENCE ESTABLISHMENT

Figure 1:
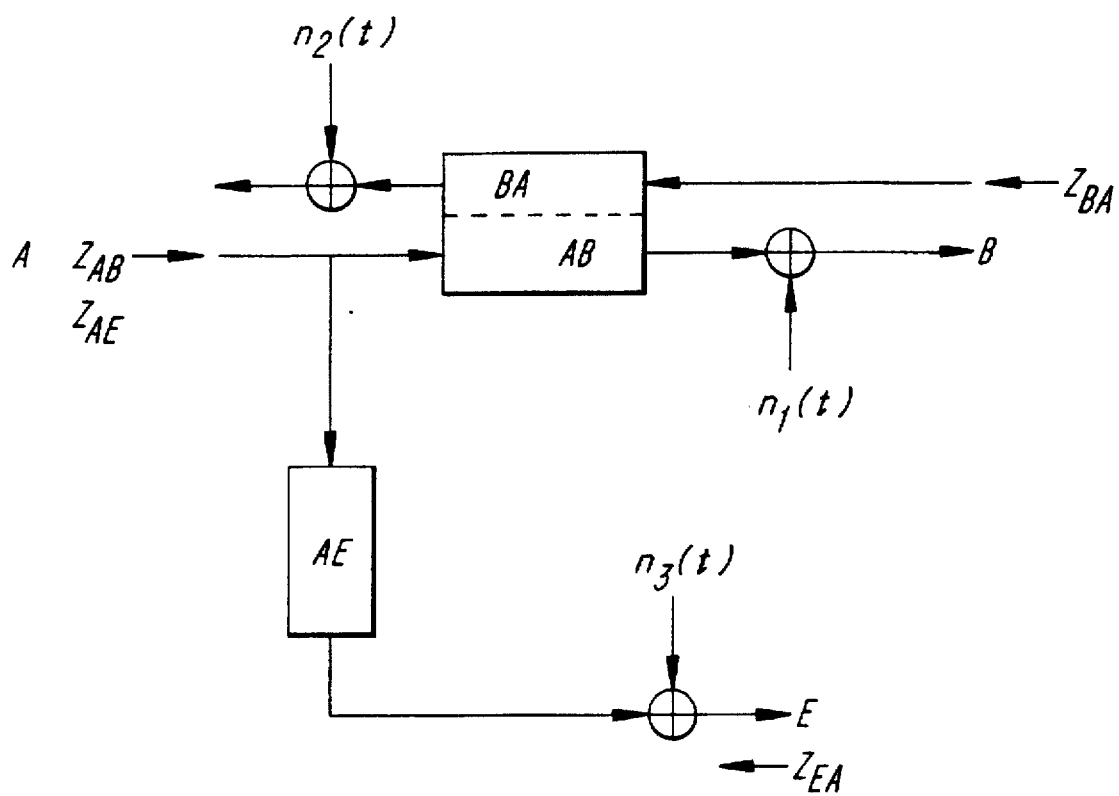
FIG. 1 is a block diagram illustrating a communication system.

A generalized communication link comprises two communication channels: a channel from a first user's transmitter to a second user's receiver, and a channel from the second user's transmitter to the first user's receiver. One can consider the link to include a third channel to an eavesdropper desiring access to the information exchanged by the first and second users. This simple scenario is depicted in FIG. 1, which shows a first user A, a second user B, and an eavesdropper E.

These channels may or may not be reciprocal, which is to say that a channel characteristic like impedance looking through the channel in one direction may or may not have same value as that characteristic looking through the channel in the other direction. As described in U.S. Pat. No. 5,604, 806, a typical radio channel used for mobile telephony is reciprocal when considered on a short time scale because a channel characteristic like impedance is the same looking through the channel in either direction, which is to say that signals propagating through the channel in either direction undergo the same multipath effects. On the other hand, other communication channels, such as wireline telephone channels, may not be reciprocal even on short time scales for a number of reasons. In a packet-switched communication system, for example, packets propagating through the channel in one direction generally take a path that is different from the path taken by packets propagating in the other direction.

For such a non-reciprocal channel, the impedance of the channel looking from A to B (call it $Z_{AB}$), the impedance of the channel looking from B to A (call it $Z_{BA}$), and the impedances $Z_{AE}$, $Z_{EA}$ of the AE channel are all different and may vary with time. In other words, the channels are not reciprocal, which is in contrast to other kinds of communication channel, such as cellular radiotelephone channels. For a reciprocal channel, the impedances $Z_{AB}$ and $Z_{BA}$ are the same, and these impedances are still different from the impedances of the AE channel. Thermal noise in each of the channels is represented by the additive noise terms $n_i(t)$, i=1, 2, 3, which contributes to the non-reciprocity of the channels.

Two methods of establishing a key sequence are described below.

COMB OF TONES

The immediately following description involves sequential transmission of substantially simultaneous pairs of tones, but it will be appreciated that more than two tones can be transmitted at a time as described later.

Figure 2:
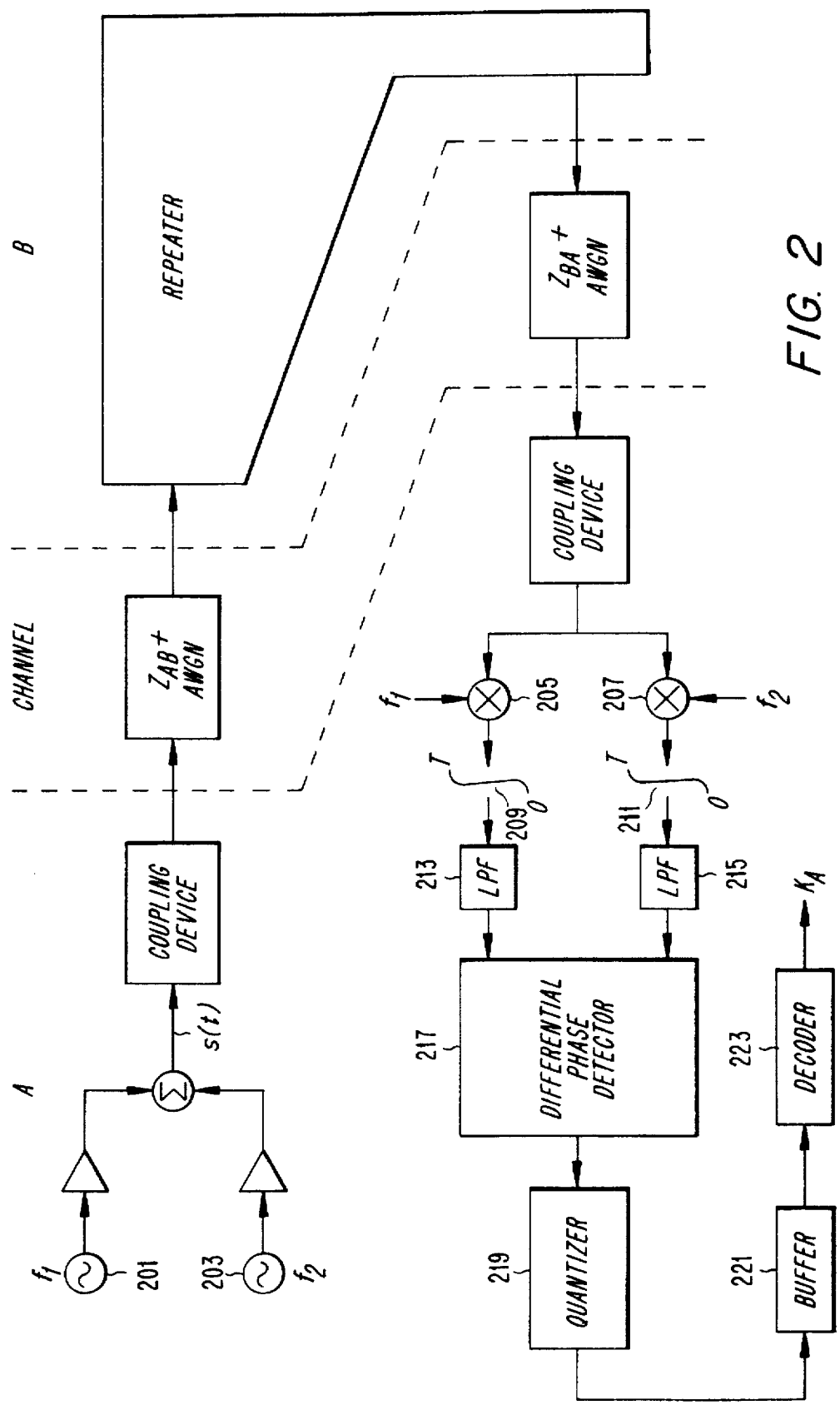
FIG. 2 is a block diagram illustrating a communication system using a comb of tones for establishing a key sequence.

Referring to FIG. 2, suppose a first transceiver such as a first user A transmits a signal s(t) comprising two sinusoids having frequencies $f_1$ and $f_2$ and having equal initial phase offsets $\phi$ and energies E during a k-th signaling interval [kT, (k+1)T]. The transmitted signal s(t) can be generated in any of a number of ways, e.g., by amplifying and summing the output signals of two suitable oscillators 201, 203 or a frequency synthesizer, and upconverting the result to a suitable transmission frequency by modulating a carrier signal. Ignoring the modulation, the transmitted signal s(t) is given by the following expression:

$$s(t) = \sqrt{2E/T} \cos(2\pi f_1 t + \phi) + \sqrt{2E/T} \cos(2\pi f_2 t + \phi)$$

In a wireline communication system, the transmitted signal s(t) is coupled to the wireline by a suitable device, such as a subscriber line interface circuit (SLIC), and the coupled signal passes through the wireline channel. The amplitude and phase of the signal arriving at a second transceiver such as a user B are determined by the equivalent impedance produced by the devices, such as the SLIC, and the transmission lines through which the transmitted signal passes on its way to the second transceiver. Among other things, white Gaussian noise n(t) having double-sided power spectral density $N_0/2$ is added, too.

In accordance with one aspect of Applicant's invention, the second transceiver simply transmits the received signal, without substantial change, back to the first transceiver. Thus, the second transceiver simply acts as a repeater for the signal used to establish the key sequence that it receives from the first transceiver. Since the components needed for repeating this signal, i.e., transmitting the received signal back to the first transceiver, are well known and conventional, they are indicated in FIG. 2 simply by the block labeled repeater.

The amplitude and phase of the signal repeated by the second transceiver that arrives at the first transceiver are further determined by the equivalent impedance of the devices and transmission lines through which the signal passes on its way back to the first transceiver. The first transceiver downconverts and amplifies the signal that it obtains from the channel if necessary (the downconverter and amplifier are not shown in FIG. 2), and correlates the resulting signal r(t) with its locally generated versions of $\cos(2\pi f_1 t)$ and $\cos(2\pi f_2 t)$. As shown in FIG. 2, each correlation can be carried out by a suitable mixer 205, 207 and a resettable integrator 209, 211, which integrates the mixer's output signal during successive time intervals $T=1/2\pi f_i$, although many other devices that are known to those of ordinary skill in this art can be used. The output signals generated by the correlators are conventionally filtered by lowpass filters 213, 215 for suppressing the sum (up-converted) signals, as well as components that might be due to nearby signals.

Assuming the sinusoids $\cos(2\pi f_1 t)$ and $\cos(2\pi f_2 t)$ are orthogonal and separated by at least the coherence bandwidth of the channel, the round-trip signal $r_{AB,BA}(t)$ received by the first user during the k-th signaling interval is given by the following expression:

$$r_{AB,BA}(t) = \alpha_{AB}\alpha_{BA}\sqrt{2E/T}\cos(2\pi f_1 t + \phi - \phi_{AB} - \phi_{BA}) + \alpha_{AB}\alpha_{BA}\sqrt{2E/T}\cos(2\pi f_2 t + \phi - \phi_{AB} - \phi_{BA})$$

where the equivalent impedance terms described above are given by the following expressions:

$$Z_{AB}=\alpha_{AB}e^{-j\phi_{AB}} \quad Z_{BA}=\alpha_{BA}e^{-j\phi_{BA}}$$

It will be appreciated that it is not necessary to use sinusoidal signals to establish a key sequence. Since it is necessary only to determine phase differences, it is possible to use pairs of other signals having predetermined shapes, e.g., pairs of pulse trains (rectangular waves). The mathematical analysis of a system using such "tones" might be more complicated than that described above (a Fourier transform, wavelet transform, or other spectral decomposition of the "tones" might be needed), but the principle would remain the same. Thus, for this application, the term "tone" should be understood to mean more than a simple sinusoidal signal.

In the first user's transceiver, the filtered correlator output signals are provided to a differential phase detector 217, which generates, for each time interval T, an estimate of the difference between the phase terms in the preceding expression. The successive phase-difference estimates are provided to a quantizer 219, which allocates a respective one of a number of predetermined values to each phase-difference estimate. In accordance with Applicant's invention, it is only necessary that the phase-difference estimates for different time intervals be uncorrelated with each other. (In the following, the time index k will be dropped when it results in no ambiguity.)

Figure 3:
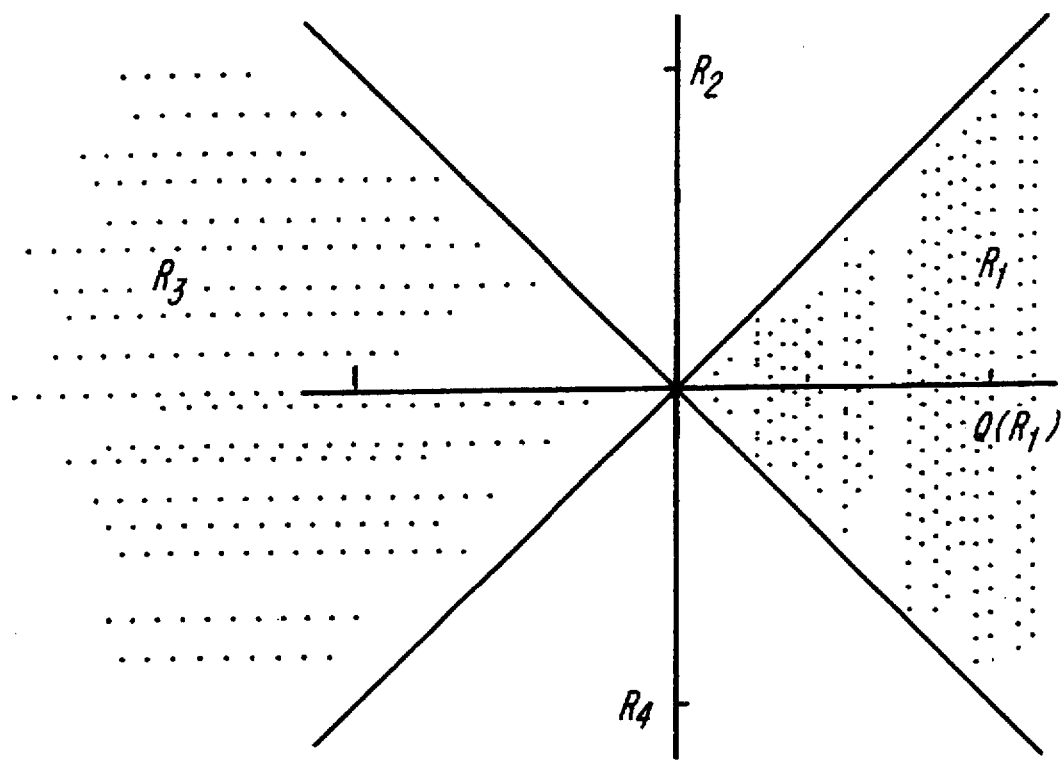
FIG. 3 shows phase-space decision regions.

The baseband differential signal $U_A$ generated by the differential phase detector 217 in the transceiver A is given by the following expression:

$$U_A = 2\alpha_{AB}\alpha_{BA}Ee^{-j(\phi_{AB}+\phi_{BA})} + \alpha_{AB}N_1 + \alpha_{BA}N_2^* = X_A + jY_A$$

where $N_1$ and $N_2$ are complex-valued, gaussian-distributed random processes having zero means and variances $\sigma^2=2EN_0$, and * indicates conjugation. As noted above, the first user A quantizes each phase-difference estimate into one of M predetermined values, generating a quantizer output signal $Q(\Phi^A)$ FIG. 3 illustrates phase-space decision regions for M=4.

The differential phase detector 217 may produce either an analog or a digital measurement of the baseband signal's instantaneous amplitude and phase. A suitable differential detector is a combination of two of the phase detectors described in U.S. Pat. No. 5,084,669 to Dent and U.S. Pat. No. 5,220,275 to Holmqvist, both of which are expressly incorporated here by reference.

By repeating the above estimation-quantization process at each of times k=1, 2, . . . , n, the first user A establishes a sequence of quantized phase-difference estimates that is given by the following expression:

$$r_A = [Q(\Phi_1^A), Q(\Phi_2^A), \ldots, Q(\Phi_n^A)].$$

This sequence $r_A$ of values generated by the quantizer 219 is stored in a buffer 221, such as a random-access memory, a shift register, or equivalent device, which has a length that is determined by parameters of a minimum distance, error correction decoder 223. The error correction decoder 223 in the transceiver A transforms the sequence of quantized difference estimates and generates an output signal that corresponds to the receiver's key sequence $k_A$ for user A.

In effect, the size of the buffer 221 is determined by the length of the key sequence desired. If the decoder 223 has a block length N and dimensionality k, then the buffer delay is N for this example in which the comb consists of only two tones simultaneously transmitted at each of N times. As described below, more than two tones can be simultaneously transmitted, which reduces the buffer delay accordingly. For example, if T tones are simultaneously transmitted, T−1 phase differences can be quantized at once, and the buffer delay is N/(T−1).

The vector $r_A$ generated by the buffer 221 has N elements, each of which is M-ary, and this N-element vector is the input to any of a wide variety of minimum distance decoders 223. One useful decoder is the bounded distance decoder, which is a low-complexity decoder described in R. Blahut, *Theory and Practice of Error Control Codes*, chapt. 7, Addison-Wesley, Reading, Mass. (1983). The decoder 223 maps the N symbols generated by the buffer to another N symbols, which is the cryptographic key sequence $k_A$ of interest, as described in more detail below.

It will be appreciated that the signal processing operations carried out in the transceiver can be performed in the digital domain by a suitable digital signal processing (DSP) device. With such a configuration, almost any type of modulation can be detected by programming the DSP device to appropriately manipulate digital samples of the received signal, as described for example in U.S. patent application Ser. No. 07/967,027 to Dent et al. for "Multi-Mode Signal Processing", which is expressly incorporated here by reference. It will be appreciated that the DSP device may be implemented as hard-wired logic circuitry, or, preferably, as an integrated digital signal processor, such as an application-specific integrated circuit (ASIC). Of course it will be understood that an ASIC may include hard-wired logic circuitry that is optimal for performing a required function, which is an arrangement commonly selected when speed or another performance parameter is more important than the versatility of a programmable digital signal processor.

In a manner and with hardware similar to that described above, the second user B establishes its own sequence $r_B$ of quantized phase-difference estimates from a signal comprising a pair or comb of tones that the second user transmits to the first user and receives back from the first user.

It will be understood that both users must exchange their respective pairs of tones in a time period that is negligible with respect to the time scale of the impedance of the channel, i.e., the exchanges must be completed before the impedance changes, e.g., before the signals are assigned to a different communication path. The time scale of a wireline telephony channel is expected to be considerably longer than the time scales considered in Applicants' prior applications, on the order of milliseconds rather than microseconds. Moreover, the frequencies of the tones initially transmitted by the first user should be close enough to the frequencies of the tones initially transmitted by the second user so that the effective bi-directional impedances of the channel at those frequencies are substantially the same.

In addition, it will be appreciated that each transceiver must return the other transceiver's signal without substantially changing the phase differences between the tones. A "substantial change" in this context would be a change that would be noticeable (e.g., would lead to a different key sequence) in comparison to the phase effects arising from the effective channel impedances $Z_{AB}$, $Z_{BA}$. Similarly, in a system that uses the amplitudes of the tones, each transceiver must return the other transceiver's signal without substantially changing the amplitudes. It will be understood that in the process of returning a signal to an originating transceiver, a receiving transceiver might add or subtract offsets from the phase differences or might apply gains to the amplitudes, which ordinarily would be considered "substantial changes", provided the magnitudes of such changes are known to the originating transceiver.

Under these conditions, and since each signal initiated by each user passes through the communication channel in both directions, the probability that the sequences $r_A$, $r_B$ fall within the same sphere is nearly unity, and thus use of the decoders results in a robust key distribution scheme.

From these transmitted signals, the eavesdropper E can obtain a baseband differential signal and a sequence $r_E$ of phase-difference estimates, but not those determined by the bi-directional effective impedance of the channel between users A and B. Accordingly, the probability that the sequence $r_E$ falls within the same sphere as the sequences $r_A$, $r_B$ is substantially zero.

As noted above, each of the three sequences or vectors $r_A$, $r_B$, and $r_E$ that are established is provided as an input signal to a respective error correction decoder. The output signals generated by the decoders correspond to the key sequences $k_A$, $k_B$, $k_E$. It will be noted that no encrypting need be performed at the transceivers A, B. The decoders limit the number of possible keys to increase the probability of the first user's and second user's establishing the same key as described in more detail below. In addition, the tones $f_1$, $f_2$ should have frequencies that are sufficiently separated so that their phases are independent.

The security of the system depends on the degree to which the phases of the tones are decorrelated by passage through the communication channel. If the decorrelation is substantially complete, then the amount of work an eavesdropper must do to break the system approaches that of an exhaustive search for the key sequences $k_A$, $k_B$.

It will be appreciated that the two tones may have equal energies and equal initial phase offsets, which are easy to obtain with a phase-locked loop for example. In general, it is only necessary for these parameters to be predetermined, viz., known a priori to their respective transceivers.

Also, the preceding analysis considers only two tones transmitted at any one time, but in general, the comb could consist of more than two simultaneously transmitted tones and the preceding analysis would apply to successive pairs of such a comb of tones. In fact, the sequences $r_A$, $r_B$ could be generated all at once by substantially simultaneously transmitting a comb of the appropriate number of tones, and estimating and quantizing the phase difference of each successive pair of tones.

Simultaneous transmission of the two or more tones is desirable because it is easy then to control the initial phases of the tones, leading to a less complicated system. Nevertheless, it is necessary only that the tones be transmitted "substantially simultaneously", which is to say that each of a pair of tones can be transmitted at different times, provided the effective bi-directional impedance of the channel has not changed substantially in the interim. Again, a "substantial change" in this context would be a change that leads to the determination of a changed key sequence.

Moreover, it is not necessary that the frequency separation between the tones in one pair of tones be the same as the frequency separation between another pair; in other words, the "comb" can have unevenly spaced "teeth". Also, it is not necessary to consider only pairs of successive tones; in other words, the "teeth" in a pair can be separated by other "teeth". For example, if the comb includes ten tones $f_1$, $f_2$, ..., $f_{10}$ arranged in order of increasing frequency, the necessary uniform distribution of the phase-difference random variable could be obtained by pairing, say, the tones $f_1$ and $f_4$; $f_2$ and $f_5$; $f_3$ and $f_6$; etc. It is only necessary for the tones in each pair to be orthogonally spaced, i.e., the frequency separations must be sufficient as described above.

PILOT SYMBOLS

Instead of transmitting a comb of tones as described above, the key sequences $k_A$, $k_B$ can be established based on only a plurality of pilot symbols such as the bits that may be transmitted for synchronizing the operation of a first transceiver and a second transceiver. Two ways of establishing the keys based on the pilot symbols are described below.

A sequence k can be crudely established by hard-decision decoding the pilot symbols and mapping the resulting sequence of decoded pilot symbols to the center of a sphere. It is believed that any errors in the sequence decoded by the first user will be the same as errors in the sequence decoded by the second user. Thus, the two pilot symbol sequences will be mapped to the same sphere and yield the same key. Even if the errors in the sequences decoded by the first and second users are slightly different, the two sequences will still be mapped to the same sphere with high probability, yielding the same key. A possible shortcoming of this method is that many pilot symbols are needed to make it computationally difficult for an eavesdropper to exhaust all possibilities. If the pilot symbols were the sync bits in a cellular radio telephone system, it is currently believed that at least sixty bits would be needed.

It will be appreciated that the necessary pilot symbols need not be transmitted together, viz., it is not necessary to use consecutive bits, such as all of the sync bits in one time slot of a TDMA signal. For example, any one or more of the sync bits in one time slot can be used with any one or more of the sync bits in other time slots. It is only necessary that the groups of bits used (e.g., bits in different time slots) be separated by a time interval that is longer than the coherence time of the channel as described above.

A more refined method of establishing a key sequence based on the pilot symbols uses channel state information rather than hard-decision decoding. In this method, the first and second users interpolate known pilot symbols and quantize the outputs of the interpolators in a manner similar to that described above with respect to the method of establishing the key based on a comb of tones.

For example, after downconverting, amplifying, and filtering as necessary a signal returned from the first user, the second user determines an estimate for each of the bits in a predetermined digital word in the signal, which may be the sync portion of a time slot. Of course, the first and second users could agree to use another set of known bits. The second user determines the differences between each of the estimates and the respective predetermined bits. These difference estimates are then quantized and provided to a minimum distance decoder as described above in connection with key establishment by transmitting a comb of tones.

Figure 4:
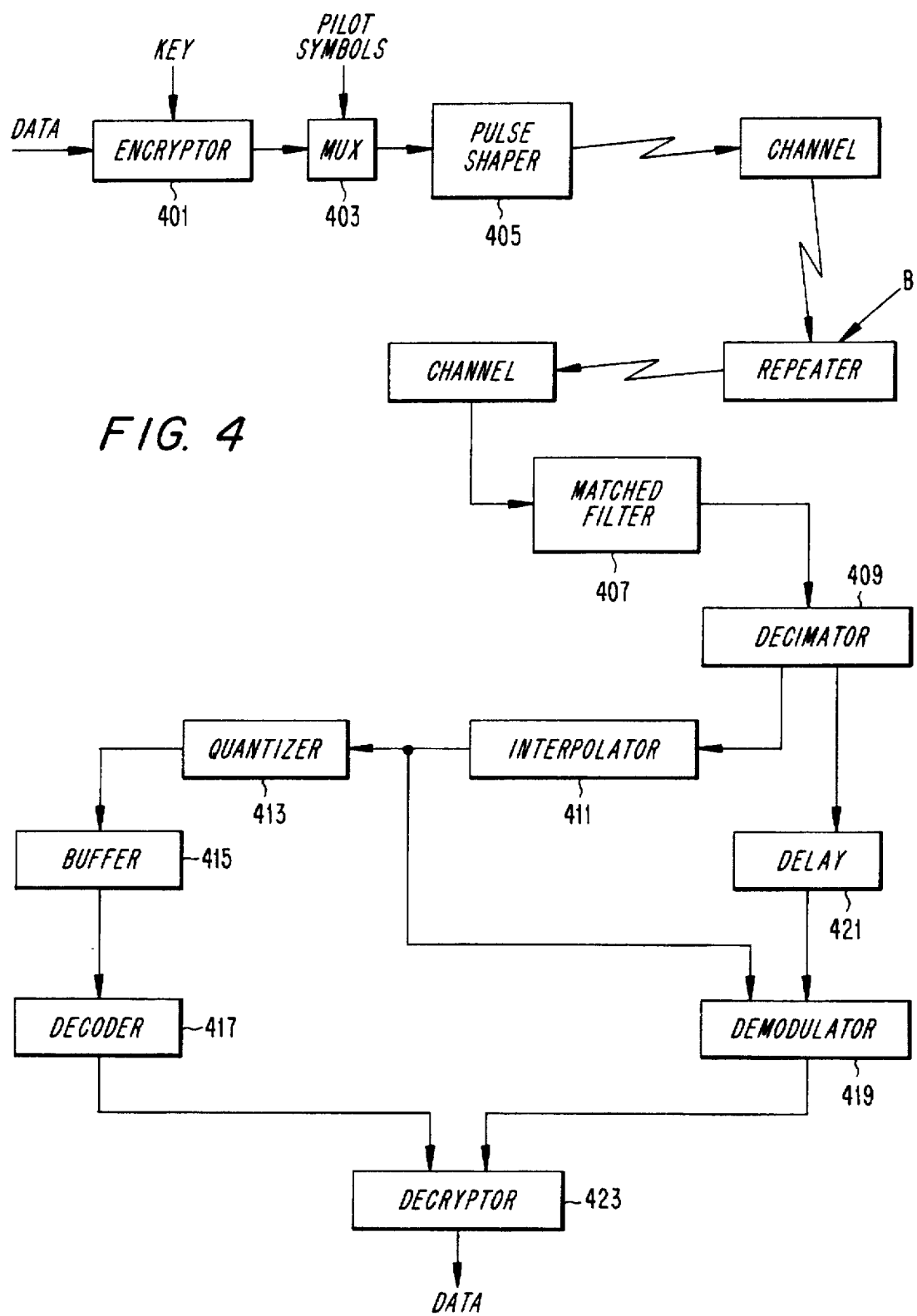
FIG. 4 is a block diagram of a communication system using pilot symbols for establishing a key sequence.

FIG. 4 is a block diagram of a system for carrying out this "refined method" of using pilot symbols. In user A's first transceiver, data to be transmitted is encrypted according to a key sequence by an encryptor 401. Of course, before the key sequence has been established, the encryptor would simply pass the data to be transmitted without alteration. A multiplexer 403 combines the encrypted data to be transmitted with the known pilot symbols, which may be bits used for synchronization and overhead signaling in conventional telephony. It is necessary only for the pilot symbols to be transmitted with known phases. The sequence of interleaved data and pilot symbols formed by the multiplexer 403 is provided to a pulse shaper or other device for coupling the information to the communication channel, which in general is characterized by an equivalent impedance and additive white gaussian noise.

At user B's second transceiver, the signal sent by the first transceiver is received and is simply transmitted without substantial change back to the first transceiver as described above. Accordingly, the second transceiver is indicated in FIG. 4 as merely a block labeled repeater. The second transceiver sends the first transceiver's predetermined digital word through a communication channel, which modifies the word in the manner described above.

The signal arriving at the first transceiver from the channel is down-converted or otherwise coupled as necessary and passed through a matched filter 407. The signal generated by the matched filter 407 is divided by a suitably controlled switch 409, or decimator, into a signal comprising the received data that was transmitted and a signal comprising the received pilot symbols. An interpolator 411 measures the phases of the received pilot symbols and forms the difference between each measured phase, which generally will have been rotated by the channel's equivalent impedance, and the known transmitted phase of the respective pilot symbol. The interpolator 411 preferably lowpass filters these difference estimates. The difference values generated by the interpolator 411 are quantized by a quantizer 413, stored in a buffer memory 415 if necessary for accumulating enough difference values, and then decoded by a decoder 417 for generating a key sequence as described above in relation to FIG. 2.

The difference values generated by the interpolator 411 are also provided to a demodulator 419 such as an error correction decoder for recovering the data that was transmitted. The demodulator 419 also receives the data that was transmitted, which may have passed through a delay device 421 suitable for synchronizing the difference values and the data that was transmitted. Assuming that received data was encrypted according to the key sequence before transmission, the encrypted transmitted data produced by the demodulator 419 and the key sequence produced by the decoder 417 are provided to a decryptor 423 for recovering the data transmitted.

In a manner and with hardware similar to that described above, the second transceiver establishes its own key sequence based on its own predetermined word sent to and returned by the first transceiver, and that key sequence will agree with high probability with the key sequence established by the first transceiver. Thus, the second transceiver can decrypt encrypted transmissions sent by the first transceiver.

SPHERE PACKING AND ASSOCIATION

Assuming that K is given and the spheres are predetermined, the general problem of mapping an arbitrary sequence to a sphere is NP-hard, viz., the computational complexity of the problem is proportional to the number of possible spheres. For this application of secure transmission and spreading, the number of spheres is prohibitively large. Nevertheless, imposing a simplifying structure on the candidate sequences k (corresponding to the representatives c of the spheres) serves to reduce the computational complexity to an acceptable level.

In accordance with Applicants' invention, the set of candidate sequences is limited to the set of sequences of a linear block error correcting code. The radii of the spheres are then determined by such a code's error correcting capability, i.e., the number of errors that the code can correct, and the received sequences r can be mapped to the candidate sequences k by an appropriate known decoding procedure.

As one specific example, linear Bose-Chaudhuri-Hocquenghem (BCH) codes can be used as the set of candidate sequences k; such codes can be decoded with low complexity using either the Peterson-Gorenstein-Zierler procedure or the Berlekamp-Massey procedure, or any procedure for decoding cyclic codes, as described in the above-cited book by R. Blahut. If the code parameters are (n, k) with minimum Hamming distance d and with code symbol alphabet $GF(2^m)$, candidate sequences of length mn can be established from a set of size $2^{mn}$. The Hamming radius t of the sphere, or equivalently the error correcting capability of the code, is given by $t \leq \lfloor (d-1)/2 \rfloor$. (The spheres need not be closely packed).

The sequences $r_A$, $r_B$, and $r_E$ are the inputs to error correction decoders implementing the Berlekamp-Massey procedure. The outputs of the decoders are the sequences $k_A$, $k_B$, and $k_E$. Again, it will be noted that no encrypting need be performed by the transceivers. The decoders substantially limit the number of possible sequences, thereby increasing the likelihood of sequence agreement between the first and second users. It may be noted that decoders are not be needed if the signal-to-noise ratios (SNRs) are very high, which might not be too difficult to obtain in a practical wireline communication system.

In many communication systems, an information sequence to be communicated is block-coded for correcting errors. In orthogonal block coding, a number N of information bits are converted to one of $2^N$ N-bit orthogonal codewords. Decoding such an orthogonal codeword involves correlating it with all members of the set of $2^N$ codewords. The binary index of the codeword giving the highest correlation yields the desired information. For example, if the correlations of a received 16-bit codeword with each of the set of sixteen orthogonal 16-bit codewords having indices 0–15 produce the highest correlation on the tenth codeword, the underlying information signal is the 4-bit binary codeword 1010 (which is the integer ten in decimal notation). Such a code is called a [16,4] orthogonal block code. By inverting all of the bits of the codewords, one further bit of information may be conveyed per codeword. This type of coding is known as bi-orthogonal block coding.

A significant feature of such coding is that simultaneous correlation with all the orthogonal block codewords in a set may be performed efficiently by means of a Fast Walsh Transform (FWT) device. In the case of a [128,7] block code, for example, 128 input signal samples are transformed into a 128-point Walsh spectrum in which each point in the spectrum represents the value of the correlation of the input signal samples with one of the codewords in the set. A suitable FWT processor is described in U.S. Pat. No. 5,357,454 to Dent, which is incorporated here by reference.

The use of a decoder is desirable for the first and second users, although not strictly required as described above, but use of a decoder does not help the eavesdropper. For spreading the information transmitted or despreading the information received, the sequence produced by the decoders can be used as it is, or a binary representation of the whole or part of the sequence can be used. It will be understood that this "spreading" does not refer to the spreading carried out in a CDMA communication system. The key sequences are generally unsuitable for use as CDMA spreading sequences due to their uncontrolled cross-correlation properties, although Applicants' key sequences can be used for encrypting and decrypting information communicated in a CDMA system. Of course, the key sequences can be used as CDMA spreading sequences by implementing the techniques described in Applicants' U.S. patent application Ser. No. 08/555,968.

Applicants' sequence agreement methods and apparatus provide superior computational secrecy as well as probabilistic secrecy. Using Applicants' invention, long arbitrary key sequences can be shared, and a key sequence can be changed even during a communication "session". In a typical communication system, it would be desirable to establish a new key sequence at least each time the users registered with or were authenticated by the communication system in preparation for a communication session, and even perhaps more frequently, such as each time a predetermined time interval elapses.

Instead of using a linear block code, a secure communication system could employ combs of 2M orthogonal tones transmitted by each user. Such a comb system has the same performance as a block-code system, but the comb system requires a much larger bandwidth, as required by orthogonal signaling, and a more complex frequency synthesizer for generating the tones.

In either system, the performance measure for security is taken to be probabilistic, and different from the Shannon measure of perfect secrecy. In particular, in the blockcode system, the probability of two users' establishing the same secret key sequence is close to one and the probability of an eavesdropper's establishing the same sequence is substantially zero. This is probabilistic secrecy. Also, the number of possible key sequences is large enough that finding the correct sequence by exhaustive search is impractical. This is computational secrecy.

While particular embodiments of Applicants' invention have been described and illustrated, it should be understood that the invention is not limited thereto. This application contemplates any and all modifications that fall within the spirit and scope of Applicant's invention as defined by the following claims.

What is claimed is:

1. A method of establishing a key sequence for secure communication through a communication channel between a first transceiver and a second transceiver, comprising the steps of:

in the first transceiver, transmitting a first plurality of tones, each tone having a respective predetermined frequency and a predetermined initial phase;

in the second transceiver, receiving the first plurality of tones transmitted by the first transceiver and transmitting the received first plurality of tones without substantial change back to the first transceiver;

in the second transceiver, transmitting a second plurality of tones, each tone having a respective predetermined frequency and a predetermined initial phase;

in the first transceiver, receiving the second plurality of tones and transmitting the received second plurality of tones without substantial change back to the second transceiver;

in the first transceiver, determining differences between phases of pairs of the received first plurality of tones, quantizing each difference into a respective one of a plurality of phase decision values; and decoding a plurality of the quantized differences into a key sequence according to a predetermined block code; and in the second transceiver, determining differences between phases of pairs of the received second plurality of tones, quantizing each difference into a respective one of a plurality of phase decision values; and decoding a plurality of the quantized differences into the key sequence according to the predetermined block code.

2. The method of claim 1, further comprising, in each of the first and second transceivers, the step of determining a magnitude of each of its respective received plurality of tones, wherein the magnitudes are used in the decoding step as soft information.

3. The method of claim 1, further comprising, in at least one of the first and second transceivers, the step of encrypting information to be transmitted according to the key sequence; and in at least the other one of the first and second transceivers, the step of decrypting encrypted transmitted information according to the key sequence.

4. The method of claim 3, wherein the encrypting step comprises the step of combining the key sequence and the information to be transmitted in a stream cipher system.

5. The method of claim 3, wherein the encrypting step comprises the step of combining the key sequence and the information to be transmitted in a block-oriented cipher system.

6. An apparatus for establishing a key sequence for secure communication through a communication channel between a first transceiver and a second transceiver, comprising:

in the first transceiver, means for transmitting a first plurality of tones, each tone having a respective predetermined frequency and a predetermined initial phase;

in the second transceiver, means for receiving the first plurality of tones transmitted by the first transceiver and transmitting the received first plurality of tones without substantial change back to the first transceiver;

in the second transceiver, means for transmitting a second plurality of tones, each tone having a respective predetermined frequency and a predetermined initial phase;

in the first transceiver, means for receiving the second plurality of tones and transmitting the received second plurality of tones without substantial change back to the second transceiver;

in the first transceiver, means for determining differences between phases of pairs of the received first plurality of sinusoidal signals; means for quantizing each difference into a respective one of a plurality of phase decision values; and means for decoding a plurality of the quantized differences into a key sequence according to a predetermined block code; and in the second transceiver, means for determining differences between phases of pairs of the received second plurality of sinusoidal signals; means for quantizing each difference into a respective one of a plurality of phase decision values; and means for decoding a plurality of the quantized differences into the key sequence according to the predetermined block code.

7. The apparatus of claim 6, further comprising, in each of the first and second transceivers, means for determining a magnitude of each of its respective received plurality of tones, wherein the magnitudes are used by the decoding means as soft information.

8. The apparatus of claim 6, further comprising, in at least one of the first and second transceivers, means for encrypting information to be transmitted according to the key sequence; and in at least the other one of the first and second transceivers, means for decrypting encrypted transmitted information according to the key sequence.

9. The apparatus of claim 8, wherein the encrypting means comprises means for combining the key sequence and the information to be transmitted in a stream cipher system.

10. The apparatus of claim 8, wherein the encrypting means comprises means for combining the key sequence and the information to be transmitted in a block-oriented cipher system.

* * * * *